FIG. I.

INVENTOR.
MARIO BALLESTRA

July 8, 1958

M. BALLESTRA 2,842,193

SPRAY DRYING PROCESS AND APPARATUS

Filed Aug. 29, 1952

INVENTOR.
MARIO BALLESTRA

ATTORNEY

United States Patent Office 2,842,193
Patented July 8, 1958

2,842,193
SPRAY DRYING PROCESS AND APPARATUS
Mario Ballestra, Genoa, Italy
Application August 29, 1952, Serial No. 307,112
Claims priority, application Italy December 18, 1951
5 Claims. (Cl. 159—4)

The present invention relates to the spraying of a slurry or solution, particularly a soap or detergent, in a cylindrical chamber. The spray in finely divided form comes in contact with heated air or gas blown into the chamber. In spraying plants of this type there is a production of hollow particles by a rapid drying of the treated material. Known plants of this type have serious drawbacks especially with respect to the formation of fines, due to the difficulty or the impossibility of regulating the drying process and of treating materials which are much affected by temperature, etc., and therefore of acting on the qualities of the product.

The present invention relates to a spraying chamber and particularly to an apparatus for drying, granulating, crystallizing and solidifying solutions or slurries, particularly of soaps, detergents, synthetic detergents and every material which can be produced in solid form from its solutions or slurries; as well as solutions or slurries of crystallizable materials or products having a solidification point higher than the temperature of the air which is used for refrigeration.

The basic characteristics of the present invention are:

The spraying chamber has a conical upper end in which is placed a first, upper hood whose walls are parallel to the conical walls of the chamber. Inside the upper hood are placed the ducts for the drying or treating air or gas, which is generally at high temperature but essentially at a controlled temperature, and the spraying nozzles. Ducts for air at a controlled temperature or suction ducts are placed in the top of the conical upper end of the chamber. In the upper end of the chamber are also placed spraying nozzles of the pressure type and of the two-fluid type with controlled air temperature. The cylindrical spraying chamber has spraying nozzles near the upper end thereof which are directed downward and inward tangentially of the axis of the chamber, so that the paths of the sprays lie substantially wholly beneath the lower edge of the upper conical hood. The chamber is provided with at least one distributor of air or gas located between the top and the bottom of the tower. The air or gas ducts are provided with the usual devices for regulating the pressure and the temperature of the gas. The bottom of the spraying chamber is in the form of a cone, at the end of which the sprayed particles are discharged continuously. At the base of this conical bottom of the tower are located air or gas distributors. Near the bottom of the tower a second, lower conical hood with the large base towards the base of the chamber, is located. The lower conical hood is designed to diminish the cross-section of the tower, and therefore to restrict the flow passage of the air and sprayed particles in the lower end zone of the chamber.

The various air or gas distributors, located inside the tower, can also acts as air or gas suction ducts. The lower conical hood located in the conical bottom of the spraying chamber is provided with special devices which may be operated to produce a reduction in pressure inside the hood and to allow the withdrawing or exhausted air and fine particles produced in the spraying process by suction.

The circulating gas or air is supplied in a closed system which consists of a conventional oil burning furnace, several fans either for the spraying air, or for the treating air or gas, regulating devices for controlling the temperature and pressure of said air or gas, cyclone dust collectors for separating the fine particles from the spent treating air or gas, and a refrigerating unit for cooling the air or gas from the chamber.

The chamber, in one particular application, has its lower end in direct connection with the outside, either through the discharge duct, or through openings located in the conical wall.

Moreover the spraying apparatus is furnished with a perfuming unit, which operates directly on the sprayed product before its discharge from the spraying chamber.

Referring to the drawings.

Figure 1:
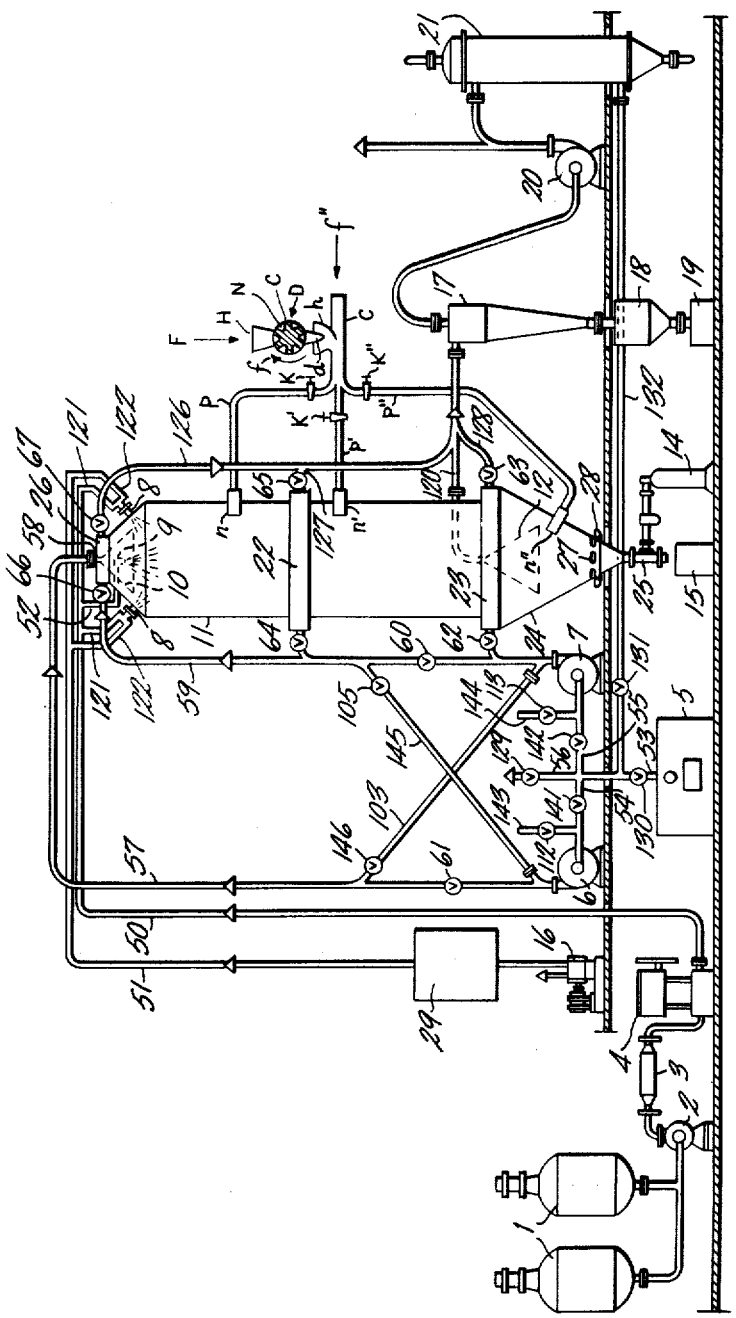
Fig. 1 is a somewhat schematic view in elevation of a preferred form of the apparatus in which the process of the present invention can be successfully conducted.
Figure 2:
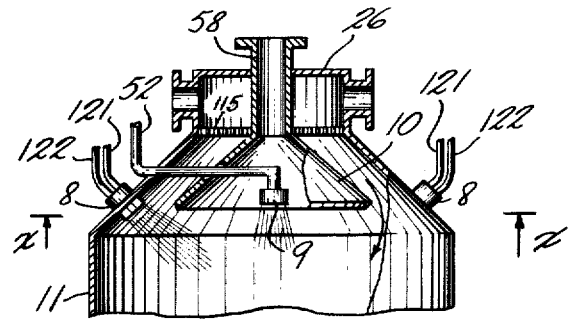
Fig. 2 is an enlarged fragmentary view in vertical axial section through the upper end of the spraying chamber and the upper conical hood positioned therein, certain parts of the apparatus being shown in elevation.
Figure 3:
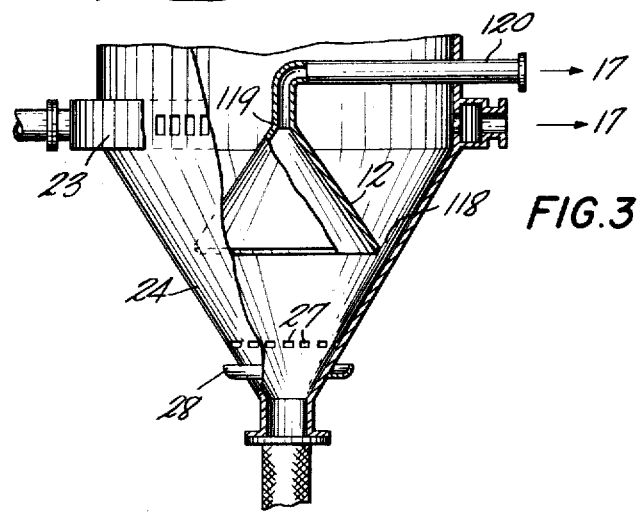
Fig. 3 is an enlarged fragmentary view in vertical axial section through the lower end of the spraying chamber and the lower conical hood positioned therein, certain parts of the apparatus being shown in elevation.
Figure 4:
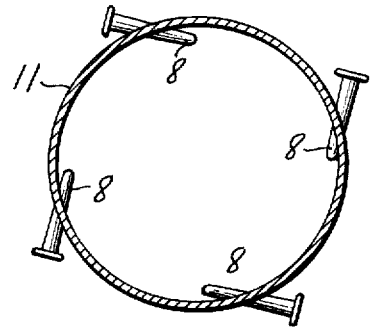
Fig. 4 is a fragmentary horizontal section through the upper end of the spraying chamber, the section being taken generally along line X—X of Fig. 2, the upper conical hood and its attendant parts being omitted for simplicity of illustration.

The material to be handled is blended in special mixers 1, is pumped by means of a pump 2 through a filter unit 3 and by means of another pump 4 to the nozzles 8 through conduits 50 and 121, where it comes in contact with compressed air blown by an air compressor 16 through preheater 29 and conduit 51 to branch conduits 122 connected to nozzles 8. The spraying chamber 11 has in its upper part a zone 26 where air inlets are located. Under this zone the chamber has the form of a truncated cone in which there is located one coaxial conical hood 10. The nozzles 8 are located in a position to spray under the lower edge of the cone 10. Inside the cone 10 is located at least one nozzle 9 fed with the material to be sprayed under the pressure of the pump 4 through conduit 50 and branch conduit 52.

A furnace 5 provides hot gases which are discharged through a conduit 53 having a valve 130 therein to branch conduits 54 and 55 leading, respectively, to driven blowers 6 and 7. Conduits 54 and 55 are provided with selectively operated valves 141 and 142, respectively. Beyond the intersection between branch conduit 53 with conduits 54 and 55, a further conduit 56 is provided with valve 129 for exhausting to the atmosphere. Between the intersection of conduit 53 with conduits 54 and 55 and the respective blowers 6 and 7, two branch pipes 143 and 144, provided with valves 112 and 113, respectively, are connected to the atmosphere. By means of said pipes 143 and 144 it will be possible to mix a predetermined desired proportion of cold air with the hot gas discharged by furnace 5.

Hot gas from the furnace, or a mixture thereof with cold air, as described, is discharged centrally within the upper end of hood 10 through conduit 57 and a nipple 58 attached to the hood. Such hot gas, or a mixture thereof with cold air, is also introduced into the upper zone of the chamber through distributor 26, or in the middle zone of the chamber through distributor 22; or in the lower zone of the chamber near the junction of the cylindrical wall with the conical bottom 24 by the distributor 23.

The annular distributor 26, which is disposed about nipple 58, has a screen-like bottom 115 through which air is discharged to the space between the conical upper end of chamber 11 and upper hood 10. Distributor 26 is supplied with gas by discharge conduit 59 from blower 7. Conduits 59 and 57 are connected by cross-conduits 103 and 145, as shown. Valves 105 and 146 in cross-conduits 103 and 145 allow gas to be delivered to distributor 23 while the flow of gas to distributors 22 and 26 is shut off. Additional valves 60 to 67 are disposed on the conduits as shown in the drawings. Thus, the conduit 59 is provided with a valve 60 between the inlet to distributor 23 and the intersection with cross-conduit 145, a valve 61 is disposed in conduit 57 between the junctions with cross-conduits 103 and 145, the inlet and outlet to distributor 23 are provided with valves 62 and 63, respectively, the inlet and outlet to distributor 22 are provided with valves 64 and 65, respectively, and the inlet and outlet to distributor 26 are provided with valves 66 and 67, respectively.

The duct 25 is connected with the perfuming unit 14. The inlet air distributors 26, 22 and 23 are connected through suction ducts 126, 127 and 128, respectively with a cyclone dust separator unit 17 which is in cycle with the suction fans 6, 7 through the fan 20 and an air refrigerating unit 21, unit 21 selectively delivering refrigerated air through conduit 132 to the intake conduit 53 for blowers 6 and 7. As shown, a valve 131 is disposed in conduit 132 and conduit 132 connects beyond valve 131 with conduit 53 above valve 130 in the latter conduit. Thus the intake conduit for blowers 6 and 7 may be selectively supplied with hot gases from furnace 5 or with refrigerated air from unit 21. The cyclone separators 17 are also connected with the vertex of a cone 12, located in the interior of the conical bottom 24 of the chamber. The lower edge of said cone 12 is located at a predetermined distance from the interior wall of the conical bottom 24 of the spraying chamber. This conical bottom has several openings 27 and a collecting drain pipe 28.

Various manners of flow of hot or cooled gases into the apparatus may be attained by varying the setting of the valves 112, 133, 129, 130, 131, 141 and 142:

1. When valves 131 and 129 are closed and valves 112 and/or 113 are closed, valves 141 and 142 being open, hot air is fed to blowers 6 and 7.

2. When valve 131 is closed and valves 112, 113, and 130 are opened (valves 112 and 113 being opened to a predetermined desired degree) with valves 141 and 142 also being open, hot air mixed with a predetermined proportion of cold atmospheric air is fed to blowers 6 and 7.

3. When valves 130 and 131 are closed and valves 112 and 113 are opened the desired amount, cold atmospheric air is fed to blowers 6 and 7, valves 141 and 142 also being open.

4. When valves 112, 113 and 130 are closed and valve 131 is opened, refrigerated air is fed from unit 21 through conduits 132 to the blowers 6 and/or 7, depending upon the status of valves 141 and 142.

5. By suitably regulating valves 130, 131, 141, 142, 112 and 113 hot, cool, or refrigerated air or gas can be supplied to blowers 6 and/or 7.

With the present spraying plant it is possible, by the use of special regulating devices, to obtain different products and to conduct different processes, viz.:

(a) Instant drying and cooling in countercurrent air;

(b) Gradual drying in countercurrent air throughout a part of the tower height and countercurrent cooling;

(c) Gradual drying in concurrent air throughout the total height of the tower and countercurrent cooling in the discharge cone;

(d) Gradual drying in concurrent air throughout the total height of the tower or part of it, with the possibility of regulating the temperature of the different zones of the tower;

(e) Partial instant drying, stoppage of the drying, and cooling in countercurrent throughout the total height of the tower;

(f) Cooling and crystallization, either in concurrent or in countercurrent;

(g) Initial cooling for partial crystallization, drying and cooling;

(h) Cooling of materials having a melting point above the temperature of the refrigerated air in the cycle, with the production of solidified granulated products;

(i) Mixing, inside the spraying chamber, of the sprayed or crystallized product with powdered materials, by means of a special proportioning device which delivers the material directly onto the product cooled but not yet solidified; and (j) Continuous perfuming of the sprayed product by means of nozzles located in the discharge cone.

The above processes are realized by regulating the pressure of the air in the nozzles 8, the pressure of the material fed to the nozzles 9, the pressure of the air blown in the zone 23, the temperature of said air and said material, the vacuum produced in the lower part of the spraying chamber by the fan 20 through the cyclone 17, etc. For carrying out operation (i), there is shown in Fig. 1 a feeding valve D having a rotor C provided with peripheral notches N rotating in the direction of the arrow $f$ discharging through outlet duct $d$ into the hopper $h$ of a duct $c$ into which is introduced compressed air in the direction of the arrow $f''$ for conveying measured portions of material which are supplied from the hopper H in the direction of the arrow F. Duct $c$ discharges into three branch ducts $p$, $p'$ and $p''$ controlled by valves K, K' and K'', respectively, and these ducts terminate in nozzles $n$, $n$,' and $n''$ which extend into the interior of the spray channel 11 at vertically spaced apart points.

In the spraying chamber there can be successive zones of concurrent and countercurrent hot or cold air, and it is possible to obtain a great variety of dried products from the same initial slurry, that is products of different granulation and bulk density.

The suction cone 12, situated in the discharge cone 24 of the chamber, is located at a height which allows a good separation by centrifuging of the sprayed product from the drying or cooling air, by means of the acceleration given to the particles from the increased speed of the air in correspondence with the diminished section of the free effluence and the sudden change of direction.

In the case of the production of hollow beads, their separation from the fines is accomplished by means of cold air in countercurrent. The granulated product is discharged through the duct 25, while the fines float in the air and are removed together with the exhausted air and recovered by the cyclone separators 17. The discharge of the sprayed product is continuous and automatic.

The upper double cone allows the blowing through its vertex of very hot air or gases, which cause the explosion or the formation of hollow particles from the material blown through the nozzles 9 soon after the hollow particles come in contact with the air at a lower temperature which is blown through the head 26 of the chamber.

In this way the chemical alteration of the heat sensitive products is avoided. The lower cone 12 with central suction, produces the separation of the fines, either by the greater speed of motion of the product in the opening of the cone 12, or by said suction action, and the hollow particles fall to the bottom. By means of the vacuum produced in the lower part of the cone 24, cold air enters through openings 27 and rises in countercurrent, causing the further cooling of the hollow particles and the complete separation of the fines.

The material which, due to improper operation of the nozzles, may drop along the walls of the cone 24, is discharged through the openings 27, thus avoiding its falling on the final product. The closed circuit cycling of the air sucked by the cyclone 17, and the presence of the refrigerator 21, allows the solidifications of particles in said closed circuit at a lower temperature than that of the surroundings and avoids evaporation of water present in the material.

Typical specific examples of use of the apparatus among those indicated above, are carried out as follows:

*1. Instant drying and cooling in countercurrent air*

In this use of the apparatus, heated air from furnace 5 is introduced into distributor 23. Valves 60, 63, 112, 131 are closed, and valves 113, 142, 62, 130 are open. To such air, which passes upwardly in chamber 11 and meets the sprays of material from nozzles 8 and 9, is added cold atmospheric air entering through openings 27. The air is exhausted from chamber 11 through conduits 126 and 120; valve 67 is open.

*2. Gradual drying in countercurrent air through a portion of chamber or tower height, and countercurrent cooling*

In this use of the apparatus heated air from furnace 5 is introduced into chamber 11 through distributor 22; valves 130, 142, 113, 60, 64 are open; the other valves are closed. Cold atmospheric air is added thereto by flow into the chamber 11 and then upwardly therein, through openings 27. Air is exhausted from the chamber as in (1) above; valve 67 is open.

*3. Gradual drying in concurrent air through the total height of the chamber and countercurrent cooling in the discharge zone*

Heated air is introduced into chamber 11 through distributors 22 and 26; valves 130, 142, 113, 60, 64, 141, 112, 61 are open; the other valves are closed. Valve 141 is open so that such heated air is discharged by blower 6 to hood 10. Valve 67 is open.

The manner of operation of the apparatus in each of the other indicated methods of its use will readily be apparent from the above. Thus, for example, when the apparatus is operated to give partial instant drying, stoppage of the drying, and cooling in countercurrent through the total height of the chamber or tower; valves 113, 62, 105, 141, 112, 66 and 65 are open; the other valves are closed; cool air is introduced into the chamber by distributor 23, warm air is introduced by distributor 26, and the cool and warm air are exhausted through distributor 22.

When the material is cooled and crystallized in concurrent air, valves 112, 105 and 66 are open; the other valves are closed; cool air is introduced into the top of the chamber at nozzles 8 and distributor 26 and is exhausted by hood 12 through conduit 120. When a countercurrent is desired in such process; the valves 113 and 62 are open and additional cool air may be introduced through distributor 23. For initially cooling the material for partial crystallization, drying and cooling valves 112, 105, 66, 130, 142, 113, 60 and 64 are open; the other valves are closed; cool air is introduced through distributor 26 and warm air is introduced through distributor 22, air being exhausted from hood 12 through conduit 120.

The invention includes many modifications and particulars not set forth in the foregoing description which is given only by way of example taken in connection with the preferred form of apparatus shown in the enclosed drawing.

What I claim is:

1. An apparatus for spray drying solid materials associated with a liquid medium which comprises, in combination, means defining a vertical chamber, means communicating with the upper portion of the chamber for introducing the material to be spray dried into the upper portion of said chamber, means for conducting air into the chamber to impinge upon and thereby disperse said material as it is introduced into the chamber, means for selectively supplying heated air and atmospheric air to said chamber for contact with the material being spray dried, a first distributor in the upper portion of said chamber, a second distributor in the lower portion of said chamber, and a third distributor intermediate said first and said second distributors, said three distributors being connectable with said means for selectively supplying heated air and atmospheric air, exhaust means for removing air and gaseous products from said chamber, said exhaust means being connectable to said three distributors, whereby air and gaseous products may be introduced and may be withdrawn selectively through said distributors.

2. An apparatus for spray drying solid materials associated with a liquid medium which comprises, in combination, means defining a vertical chamber, means communicating with the upper portion of the chamber for introducing the material to be spray dried into the upper portion of said chamber, means for conducting air into the chamber to impinge upon and thereby disperse said material as it is introduced into the chamber, means for selectively supplying heated air and atmospheric air to said chamber for contact with the material being spray dried, a first distributor in the upper portion of said chamber, a second distributor in the lower portion of said chamber, and a third distributor intermediate said first and said second distributors, said three distributors being connectable with said means for selectively supplying heated air and atmospheric air, exhaust means for removing air and gaseous products from said chamber, said exhaust means being connectable to said three distributors, whereby air and gaseous products may be introduced and may be withdrawn selectively through said distributors, the upper portion of said chamber being conical and having disposed within it a concentric hollow conical baffle member, the means for introducing into the chamber the material to be treated being located interiorly of said cone and the means for introducing the dispersing gas directing it in at least one jet having a path mainly below the base of said cone, the first distributor being positioned to discharge the drying gas into the annular space between the exterior surface of the conical baffle and the interior surface of the conical top of the chamber.

3. An apparatus for spray drying solid materials associated with a liquid medium which comprises, in combination, means defining a vertical chamber, means communicating with the upper portion of the chamber for introducing the material to be spray dried into the upper portion of said chamber, means for conducting air into the chamber to impinge upon and thereby disperse said material as it is introduced into the chamber, means for selectively supplying heated air and atmospheric air to said chamber for contact with the material being spray dried, a first distributor in the upper portion of said chamber, a second distributor in the lower portion of said chamber, and a third distributor intermediate said first and said second distributors, said three distributors being connectable with said means for selectively supplying heated air and atmospheric air, exhaust means for removing air and gaseous products from said chamber, said exhaust means being connected to said three distributors, whereby air and gaseous products may be introduced and may be withdrawn selectively through said distributors, the lower end of the chamber being in the shape of an inverted cone and having an upright hollow conical member disposed interiorly thereof, the vertex of said conical member being connected to said exhaust means, whereby gases are withdrawn from the lower end of said chamber through said conical member.

4. An apparatus for spray drying solid materials associated with a liquid medium which comprises, in combination, means defining a vertical chamber, means communicating with the upper portion of the chamber for introducing the material to be spray dried into the upper portion of said chamber, means for conducting air into the chamber to impinge upon and thereby disperse said material as it is introduced into the chamber, means for selectively supplying heated air and atmospheric air to said chamber for contact with the material being spray dried, a first distributor in the upper portion of said chamber, a second distributor in the lower portion of said chamber, and a third distributor intermediate said first and said second distributors, said three distributors being connectable with said means for selectively supplying heated air and atmospheric air, exhaust means for removing air and gaseous products from said chamber, said exhaust means being connectable to said three distributors, whereby air and gaseous products may be introduced and may be withdrawn selectively through said distributors, the lower end of the chamber being in the shape of an inverted cone and having an upright hollow conical member disposed interiorly thereof, the vertex of said conical member being connected to said exhaust means whereby gases are withdrawn from the lower end of said chamber through said conical member, said lower end of said chamber being provided with openings for admission of the air surrounding the chamber, said openings being disposed below the base of said conical member.

5. An apparatus for spray drying solid materials associated with a liquid medium which comprises, in combination, means defining a vertical chamber, means communicating with the upper portion of the chamber for introducing the material to be spray dried into the upper portion of said chamber, means for conducting air into the chamber to impinge upon and thereby disperse said material as it is introduced into the chamber, means for selectively supplying heated air and atmospheric air to said chamber for contact with the material being spray dried, a first distributor in the upper portion of said chamber, a second distributor in the lower portion of said chamber, and a third distributor intermediate said first and said second distributors, said three distributors being connectable with said means for selectively supplying heated air and atmospheric air, exhaust means for removing air and gaseous products from said chamber, said exhaust means being connectable to said three distributors, whereby air and gaseous products may be introduced and may be withdrawn selectively through said distributors, the upper portion of said chamber being conical and having disposed within it a concentric hollow conical baffle member, the means for introducing into the chamber the material to be treated being located interiorly of said cone and the means for introducing the dispersing gas directing it in at least one jet having a path mainly below the base of said cone, the first distributor being positioned to discharge the drying gas into the annular space between the exterior surface of the conical baffle and the interior surface of the conical top of the chamber, the lower end of the chamber being in the shape of an inverted cone and having an upright hollow conical member disposed interiorly thereof, the vertex of said conical member being connected to said exhaust means whereby gases are withdrawn from the lower end of said chamber through said conical member, said lower end of said chamber being provided with openings for admission of the air surrounding the chamber, said openings being disposed below the base of said conical member.

References Cited in the file of this patent
UNITED STATES PATENTS

| | | |
|---|---|---|
| 1,609,993 | Dickerson | Dec. 7, 1926 |
| 1,634,640 | Zizinia | July 5, 1927 |
| 1,782,054 | Uhl | Nov. 18, 1930 |
| 1,923,659 | Bowen | Aug. 22, 1933 |
| 1,962,185 | Fauser | June 12, 1934 |
| 1,985,987 | Hall | Jan. 1, 1935 |
| 2,154,000 | Zizinia et al. | Apr. 11, 1939 |
| 2,230,944 | Hall | Feb. 4, 1941 |
| 2,240,854 | Peebles | May 6, 1941 |
| 2,561,394 | Marshall | July 24, 1951 |
| 2,634,808 | Arnold | Apr. 14, 1953 |
| 2,707,990 | Nyrop | May 10, 1955 |